J. BIJUR.

NEGATIVE POLE PLATE.

APPLICATION FILED JAN. 14, 1908.

12,872. Reissued Oct. 27, 1908.

Witnesses

Tom Kerrigan

E. Van Zandt

Joseph Bijur, Inventor

By his Attorneys

Binney, Brickenstein & Ogden

UNITED STATES PATENT OFFICE.

JOSEPH BIJUR, OF NEW YORK, N. Y., ASSIGNOR TO THE GENERAL STORAGE BATTERY COMPANY, A CORPORATION OF NEW YORK.

NEGATIVE-POLE PLATE.

No. 12,872. Specification of Reissued Letters Patent. Reissued Oct. 27, 1908.

Original No. 845,391, dated February 26, 1907, Serial No. 309,986. Application for reissue filed January 14, 1908. Serial No. 410,870.

DIVISION B.

*To all whom it may concern:*

Be it known that I, JOSEPH BIJUR, a citizen of the United States, and a resident of the borough of Manhattan, city, county, and State of New York, have invented certain new and useful Improvements in Negative-Pole Plates, of which the following is a specification accompanied by drawings.

This invention relates to negative pole plates for storage batteries, and the objects of the invention are to prevent the loss of capacity in the plate and coherence of the porous sponge into a metallic mass, to insure permanent passage-ways for the diffusion of the electrolyte, and to secure strong and hardy plates which will not become permanently sulfated and will have all the above desirable characteristics.

Further objects of the invention will hereinafter appear; and to these ends the invention consists of the negative pole plate embodying the features as hereinafter fully described and claimed in this specification.

The accompanying drawings show apparatus for carrying out a portion of a process for manufacturing the plate.

Figure 1:
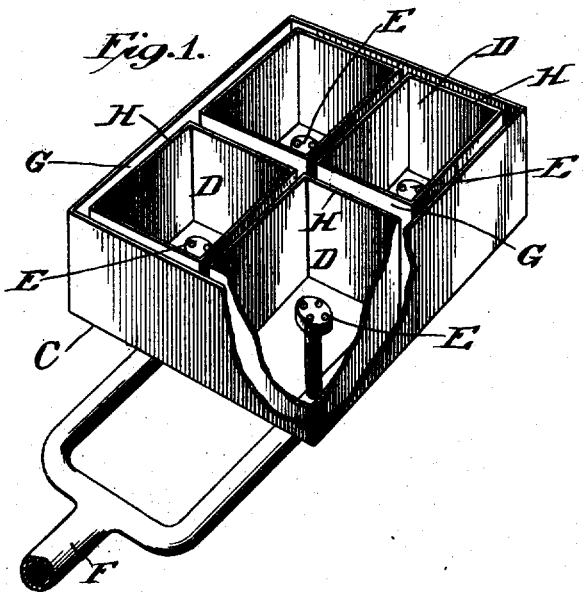
Figure 2:
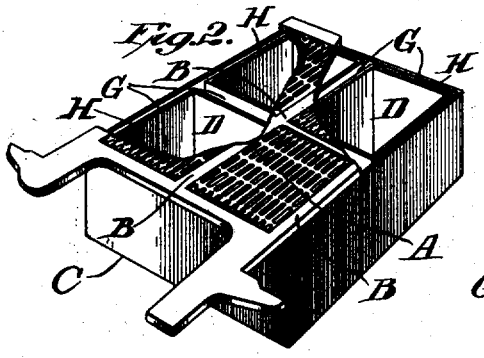
Figure 3:
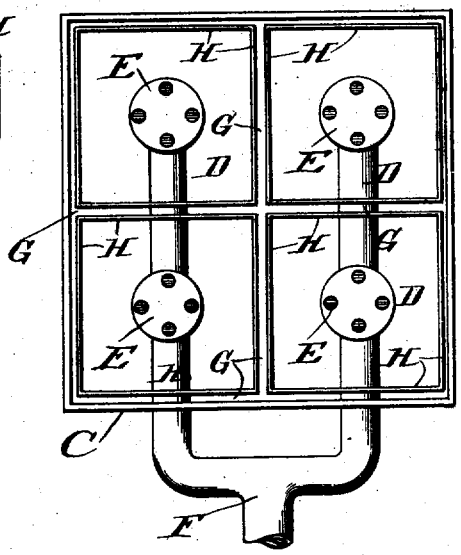

In the drawings, Figure 1 is a perspective view, partly broken away, showing heating apparatus. Fig. 2 is a perspective view showing a plate on the heating apparatus; and Fig. 3 is a top plan view of the apparatus on an enlarged scale to show the details of construction.

According to the process illustrated, the active material on the plate is impregnated with inert material of a suitable character for carrying out the objects of the invention. This material should be of a character which will not be chemically acted upon by the electrolyte—as, for instance, carbon. One of the leading characteristics of such process resides in the fact that the plates can be treated in accordance with this process after they have been formed or otherwise completed instead of having the inert material introduced into the mass of active material before the plate is finished.

In carrying out the process illustrated for a Planté plate, the plate is first formed and reduced to a negative-pole plate in the usual manner and allowed to dry. It is then soaked for about ten minutes in a solution of sugar or other suitable substance, by means of which the pores of the plate become filled with the solution. I find that a solution penetrates the pores of the plate readily, and a solution of sugar has been found to operate satisfactorily and well. The sugar solution may be of about two per cent. to about thirty per cent. strength, although other percentages may be found suitable for carrying out the process. I have found that the process is successfully carried out when the solution is at ordinary room temperature. The plate is then removed from the solution, and it may be rinsed to rinse the sugar solution from the surface of the plate or else the rinsing may be omitted. The plate is then dried by permitting it to stand in air.

If the plate is all lead, it is baked in any suitable apparatus at a temperature of from about 240° centigrade to 300° centigrade until the sugar is substantially completely carbonized, which may take five or ten minutes. If the plate has antimonious alloy parts—as, for instance, an alloy frame melting at a lower temperature than the remainder of the plate—it is treated in such manner that the alloy parts are heated less than the lead parts, so as to insure that they are not partially fused in the treatment. In the drawings a frame of heating apparatus is shown for heating a plate having an alloy frame.

A represents the plate, and B the alloy frame. The apparatus comprises a framework C, preferably constructed of sheet-steel and provided with compartments D, under each of which there is a gas-burner E, connected to a supply-pipe F. Preferably the steel framework C is double in form and provided with the air-spaces G between the walls H of the framework, and the compartments D are of substantially the same size as the grills on the plate, so that when the plate is laid on top of the framework C, as in Fig. 2, the grills are arranged over the burners, and the framework B of the plate lies along the upper surfaces of the walls of the framework C and over the air-spaces G in said framework. In accordance with this construction the grills are subjected to a higher degree of heat than the frame of the plate. Any other suitable form of apparatus may be devised for carrying out the same objects, and the invention is not limited to the apparatus shown, or the process of its manufacture. After the plate has been baked or heated it may again be rinsed to remove any of the particles of sugar which were not converted into carbon in the heating process, and the plate is ready for use. It will be found that the pores of the plate have been impregnated with inert material in the form of carbon, forming an insoluble and substantially permanent deposit in the pores.

In carrying out the process described, after the plate is removed from the solution and allowed to dry the sugar solution in the pores deposits finely-divided organic material in the plate, which material is afterward carbonized in the step of heating. By such a process the finely-divided organic material is deposited very evenly and uniformly in the pores of the plates, and it does not interfere with the natural coherence or strength of the lead. Such a process enables inactive material to be introduced into the pores of Planté plates after they have been formed, and the process may be carried out with plates which have been in use. The process enables inert material to be introduced into the pores of the active mass of negative pole Planté plates, and it may be applied to plates that have been in use and have partially lost their capacity from lack of such inert material thereby again raising the capacity of the plate. It furnishes a very easy way of obtaining a uniform distribution of a very slight percentage of inactive material which will not injuriously disintegrate the mass.

The invention also contemplates Planté plates, treated for example by soaking a plate in a solution of suitable material—as, for instance, sodium silicate—in which case the inactive material is deposited in the pores of the active mass in the plate chemically instead of by drying and carbonization.

The Planté plate after having been impregnated with carbon by being treated in accordance with the specific process described, assumes a light brownish-gray color instead of the usual lead-gray color of the Planté plate. After many discharges such plate has a very porous and spongy appearance, as distinguished from the ordinary Planté plate unimpregnated. In use the capacity of the plate either remains substantially the same or rises at first instead of falling off, so that such an impregnated Planté negative-pole plate should outlast many times a similar unimpregnated plate before losing say a third or a half of its capacity.

The process above described forms the subject of a separate patent application therefor No. 410,869 filed herewith, the improved plate being solely the subject of this present application.

I am aware that for pasted plates inert materials have been mixed with the paste before applying it to the plates and that carbon, and also kaolin, sulfate of barium, porcelain, and other materials have been used or proposed for such purpose, but it is evident that such method is quite inapplicable to producing Planté plates with their desirable characteristics, nor will it serve to impregnate the electrolytically formed and extremely minute pores of battery plates. I am also aware that with the object of rendering storage batteries easily portable and of preventing their contents from spilling when subjected to shocks or rough usage, it has been proposed to gelatinize the sulfuric acid solution by mixing with it silicate of soda, but not with any object of impregnating the pores with inert material nor, so far as I am aware, with the discovery of any useful result in respect to the condition of the pores. The present invention does not concern, and of course I make no claim to, a gelatinized electrolyte. I am also aware that it has been proposed to produce lead plates from a mechanical mixture of equal bulks of metallic lead and coarsely granulated pumice stone, or other inert substance, for the purpose of making the plate porous throughout and ramified throughout its entire structure with cells and air spaces and to form, after the plate is finished, the porous active material electrolytically in the usual way throughout the mechanically produced cells and spaces.

It will be manifest that the porous active material in such plates is to be formed from the metallic lead around the cells or spaces that ramify throughout the plate and that consequently the minute electrolytically formed pores of the active material do not contain the pumice and are not intended to contain it, but on the contrary the pumice lies outside of the active material instead of being incorporated within it or its pores.

I claim the following:

1. A negative-pole Planté plate having inert material incorporated within the active material.

2. A negative-pole Planté plate having inert material incorporated within the active material, and characterized by a brownish-gray color before use and a spongy appearance, an increased porosity of the active mass and a substantially sustained capacity in use.

3. A negative-pole Planté plate having inert material incorporated within the active material, and characterized by a brownish-gray color before use and a substantially sustained capacity in use.

4. A negative-pole Planté plate having inert material in the form of carbon incorporated within the pores of the active mass.

5. A negative-pole Planté plate characterized by having inert material incorporated in the active material and a substantially sustained capacity in use.

6. A negative-pole Planté plate having porous inert material incorporated within the active material.

7. A negative-pole Planté plate having fine deposits of inert material within the pores of the active portions.

8. A negative-pole Planté plate having porous active material carried by dense non-porous supporting portions and having the pores of the active material impregnated with finely divided inert deposits.

9. A negative-pole Planté plate having active material impregnated with inert material of a character substantially as described and for the purposes set forth.

10. A negative pole storage battery plate carrying active lead material in the reduced or negative state and characterized by the electrolytic pores thereof being impregnated with a substance insoluble and inactive in the appropriate battery fluid.

In testimony whereof I have signed this specification in the presence of two subscribing witnesses.

JOSEPH BIJUR.

Witnesses:
JAMES DIXON,
E. VAN ZANDT.